United States Patent
Hallissy et al.

(10) Patent No.: US 10,823,139 B2
(45) Date of Patent: Nov. 3, 2020

(54) BLADE SLEEVE FOR A WIND TURBINE ROTOR BLADE AND ATTACHMENT METHODS THEREOF

(71) Applicant: General Electric Company, Schenectady, NY (US)

(72) Inventors: Benjamin Patrick Hallissy, Greenville, SC (US); Andreas Herrig, Garching bei Munich (DE)

(73) Assignee: General Electric Company, Schenectady, NY (US)

(*) Notice: Subject to any disclaimer, the term of this patent is extended or adjusted under 35 U.S.C. 154(b) by 311 days.

(21) Appl. No.: 15/459,562

(22) Filed: Mar. 15, 2017

(65) Prior Publication Data
US 2018/0266388 A1  Sep. 20, 2018

(51) Int. Cl.
 *F03D 1/06* (2006.01)
 *F03D 80/30* (2016.01)

(52) U.S. Cl.
 CPC ........... *F03D 1/0675* (2013.01); *F03D 80/30* (2016.05); *F05B 2230/80* (2013.01); *Y02E 10/721* (2013.01); *Y02E 10/726* (2013.01)

(58) Field of Classification Search
 CPC .... F03D 1/0675; F03D 1/0633; F03D 1/0641; Y02E 10/721; Y02E 10/726
 USPC ......................................................... 416/224
 See application file for complete search history.

(56) References Cited

U.S. PATENT DOCUMENTS

| | | | | |
|---|---|---|---|---|
| 2,718,267 A * | 9/1955 | Woolf | .................. | B64C 11/008 416/239 |
| 4,343,238 A * | 8/1982 | Koch | ..................... | B41K 3/102 101/85 |
| 6,105,182 A * | 8/2000 | Elnar | ....................... | A61H 7/00 248/125.3 |
| 8,956,115 B2 | 2/2015 | Tobin et al. | | |
| 9,399,919 B2 | 7/2016 | Bachmann et al. | | |
| 2008/0181775 A1* | 7/2008 | Livingston | ............ | F03D 1/0675 416/95 |
| 2010/0135814 A1* | 6/2010 | Bakhuis | ................ | F03D 1/0633 416/223 R |
| 2012/0121430 A1* | 5/2012 | Olsen | ..................... | F03D 1/0675 416/241 R |
| 2013/0101426 A1* | 4/2013 | Saitou | ................... | F03D 1/0675 416/224 |
| 2013/0177433 A1* | 7/2013 | Fritz | ..................... | F03D 1/0675 416/226 |
| 2014/0186175 A1* | 7/2014 | Baehmann | ............. | F01D 5/147 416/1 |
| 2014/0328693 A1* | 11/2014 | Wilson | ..................... | F01D 5/02 416/236 R |
| 2014/0341738 A1* | 11/2014 | Bech | ..................... | F03D 1/0675 416/146 R |
| 2014/0377076 A1 | 12/2014 | Kennedy et al. | | |
| 2015/0064391 A1* | 3/2015 | Trondl | ............... | B63B 35/7909 428/80 |

(Continued)

*Primary Examiner* — Connor J Tremarche
(74) *Attorney, Agent, or Firm* — Dority & Manning, P.A.

(57) ABSTRACT

The present disclosure is directed to a blade sleeve for a blade tip of a rotor blade of a wind turbine. The blade sleeve includes a rapid-prototyped body having a pressure side, a suction side, a first open span-wise end, a closed leading edge, and a trailing edge. Further, the body is slidable onto the blade tip of the rotor blade. In addition, the blade sleeve includes at least one additional rapid-prototyped feature integral with the body.

12 Claims, 10 Drawing Sheets

(56) References Cited

U.S. PATENT DOCUMENTS

2016/0177915 A1\* 6/2016 Gonzalez .............. F03D 1/0633
　　　　　　　　　　　　　　　　　　　　　　416/223 R
2016/0327019 A1　11/2016　Tobin et al.
2016/0327020 A1　11/2016　Tobin et al.

\* cited by examiner

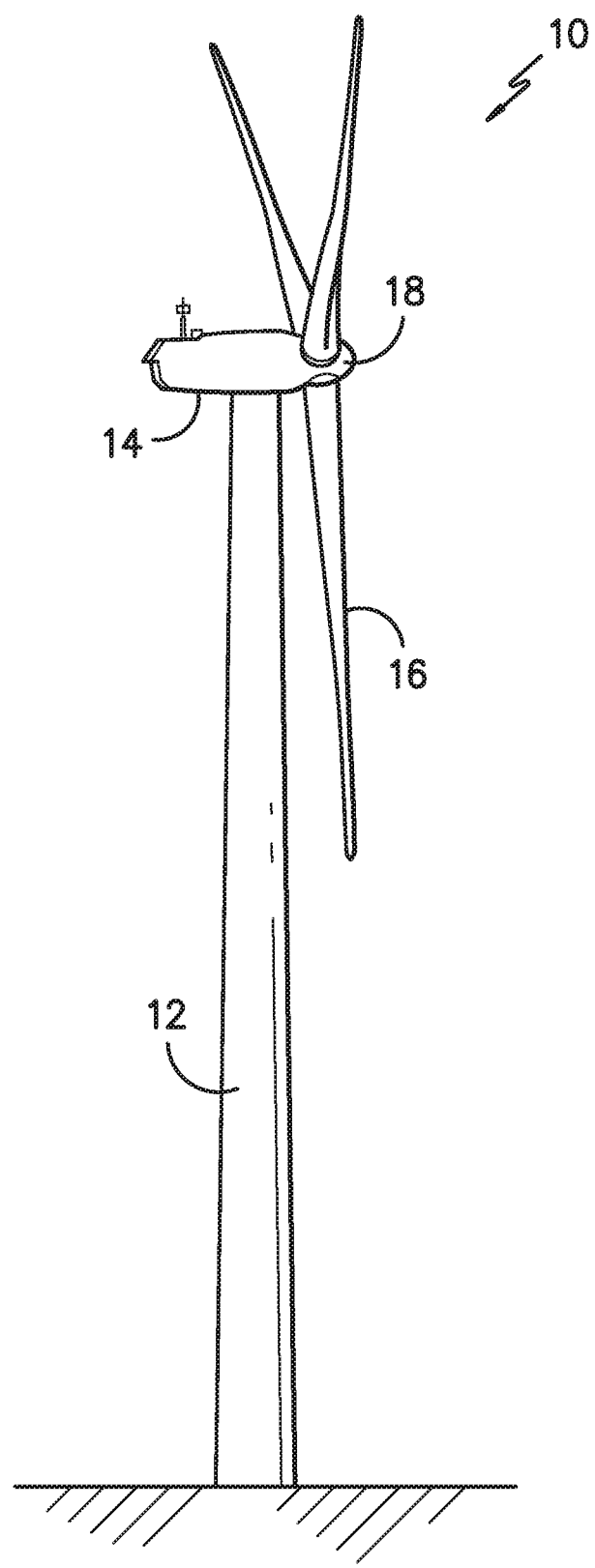
FIG. -1-

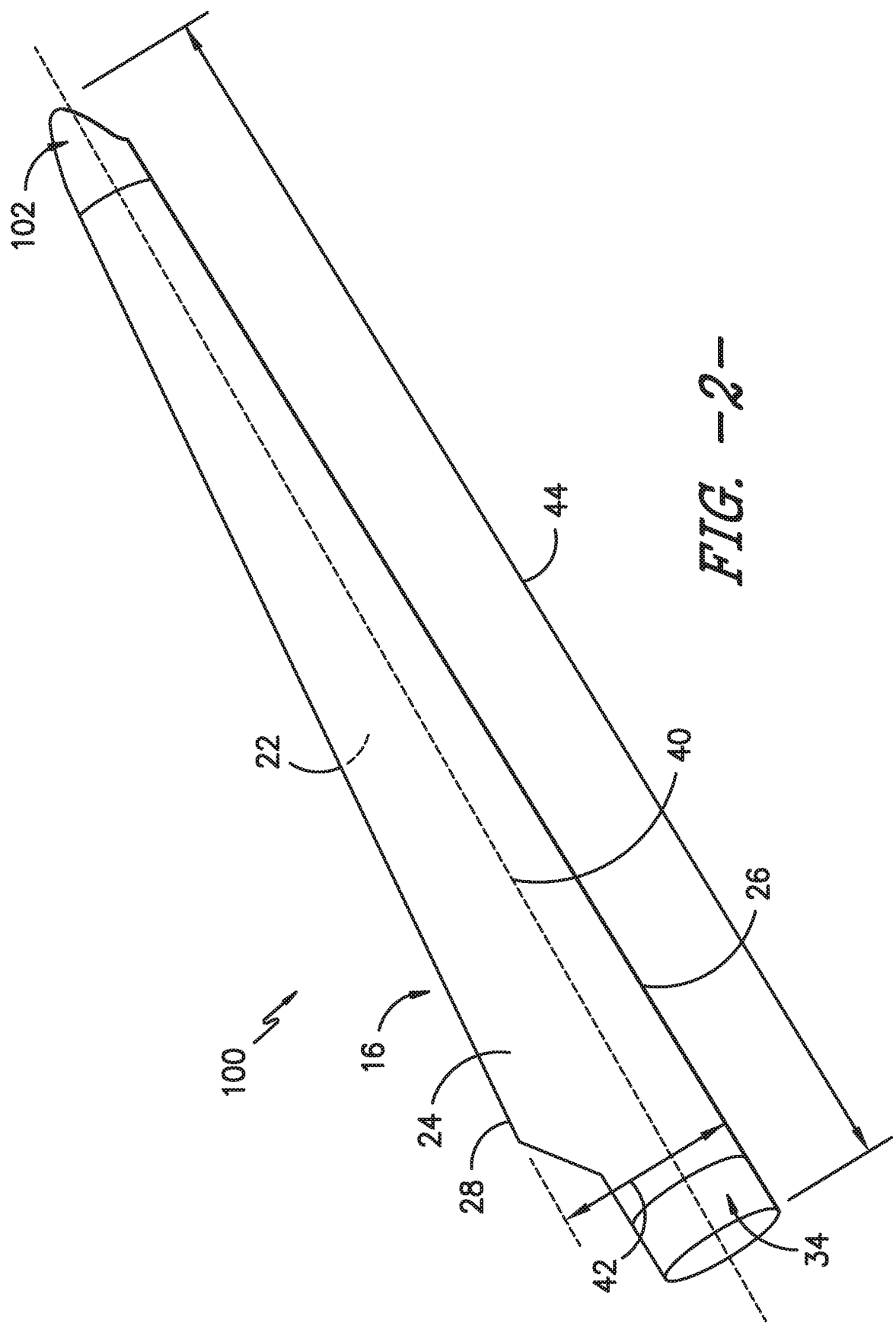
FIG. -2-

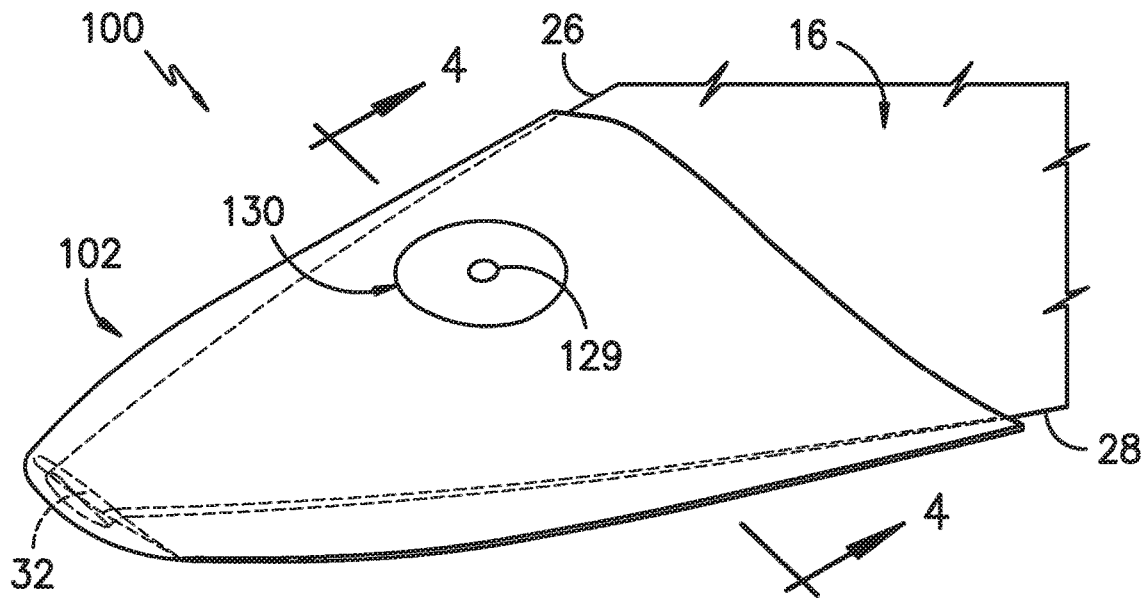
FIG. -3-
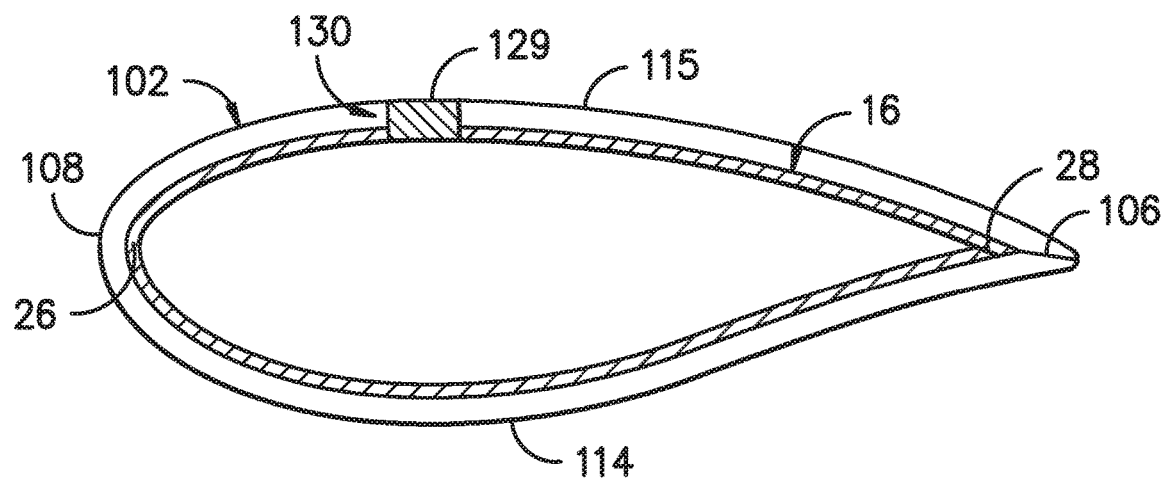
FIG. -4-

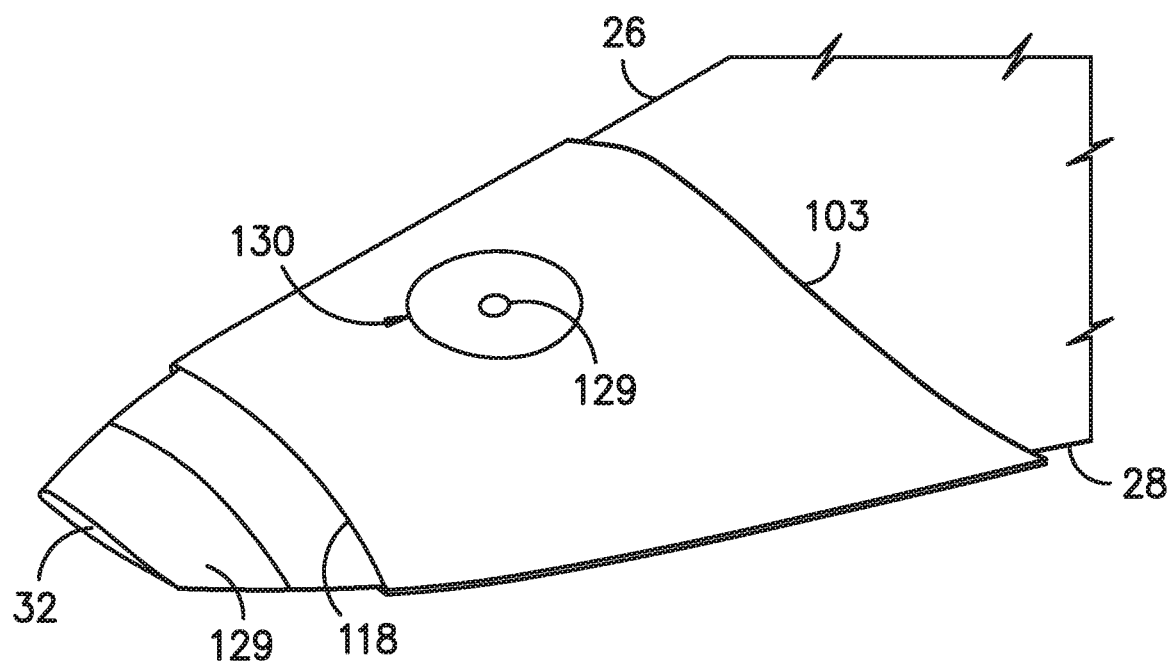
FIG. -5-

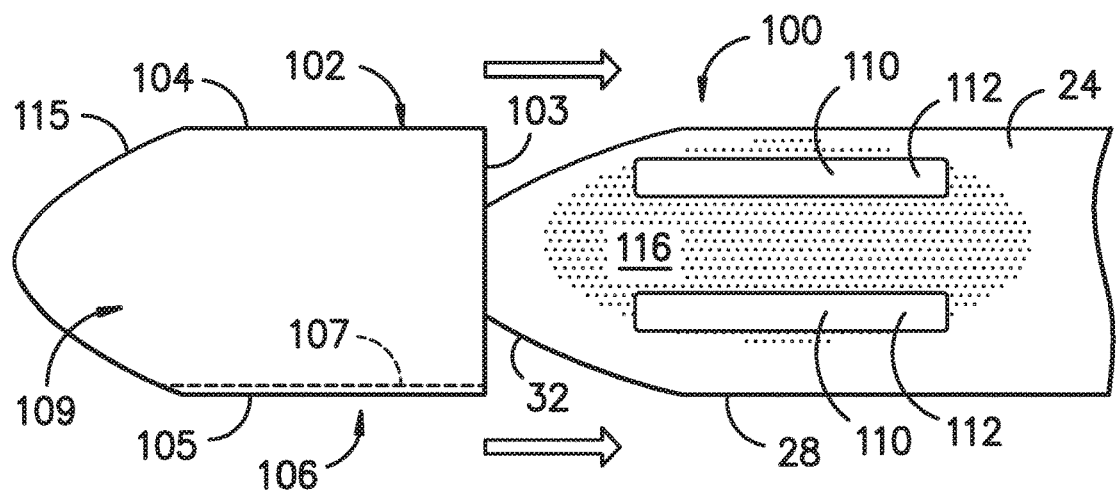
FIG. -6-
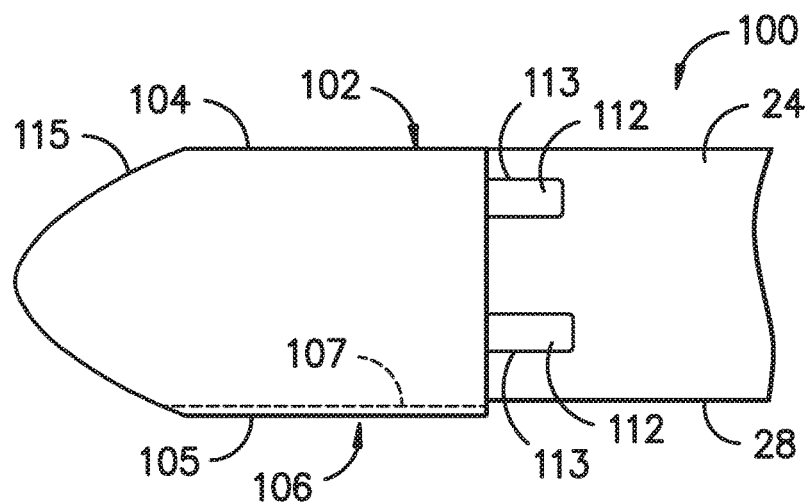
FIG. -7-
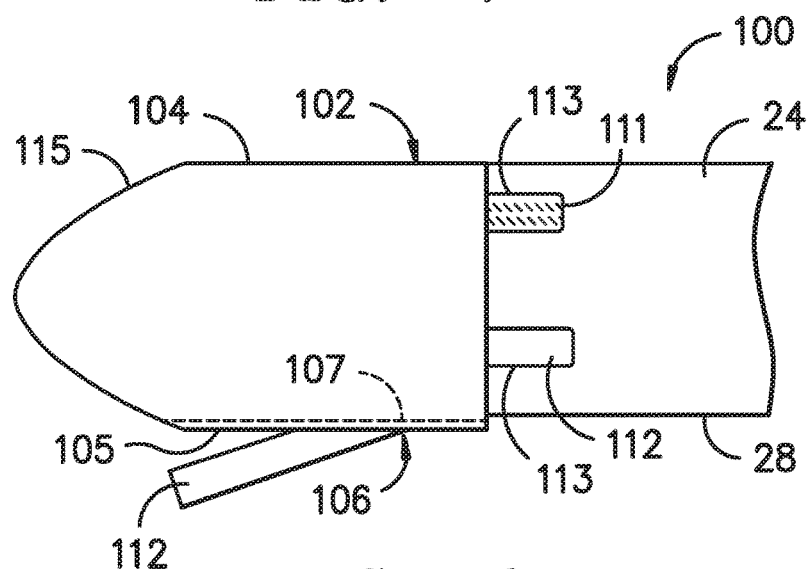
FIG. -8-

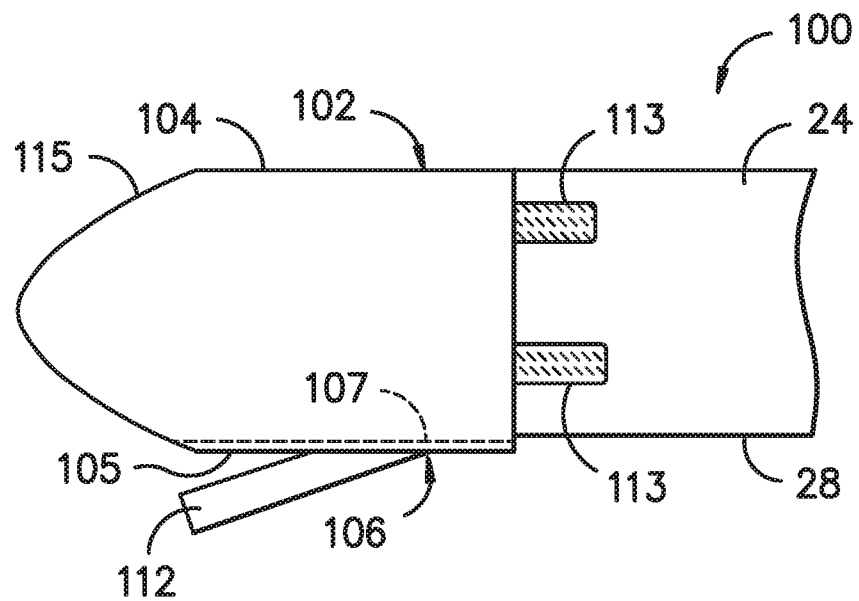
FIG. -9-
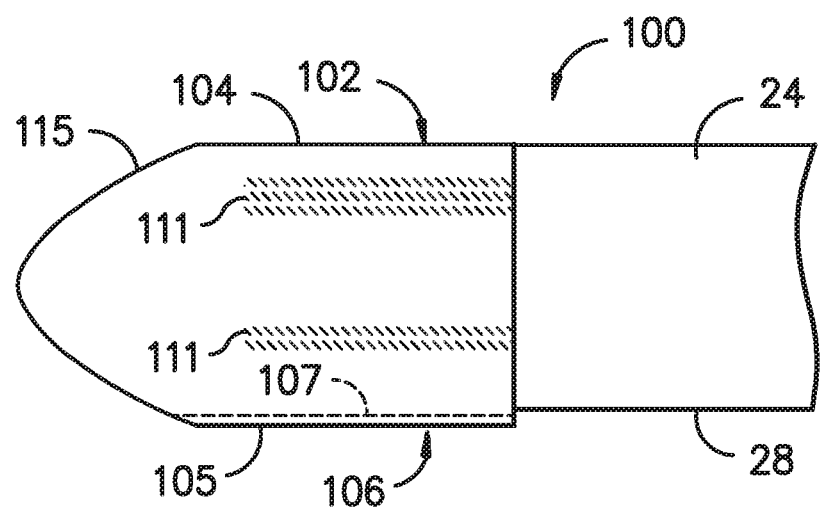
FIG. -10-

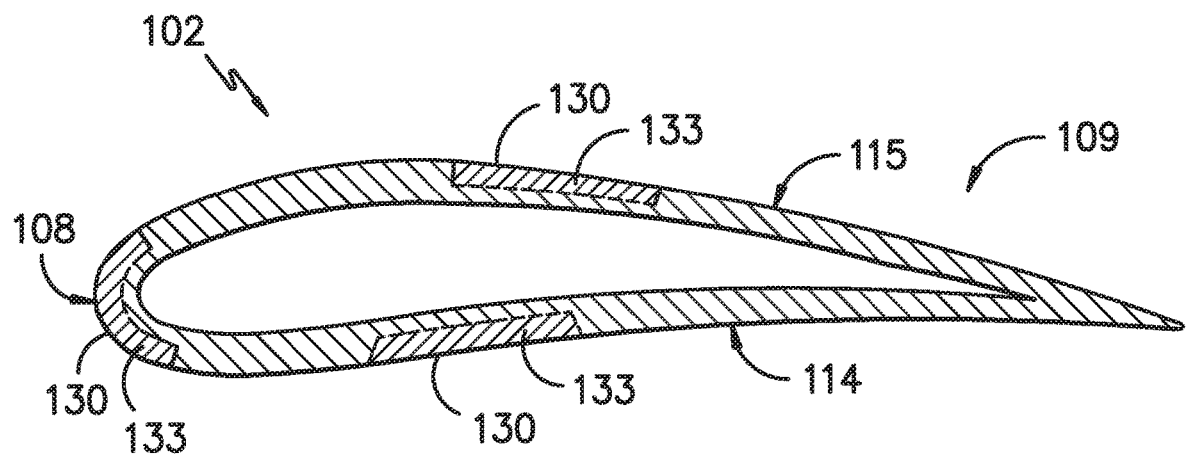
FIG. -11-
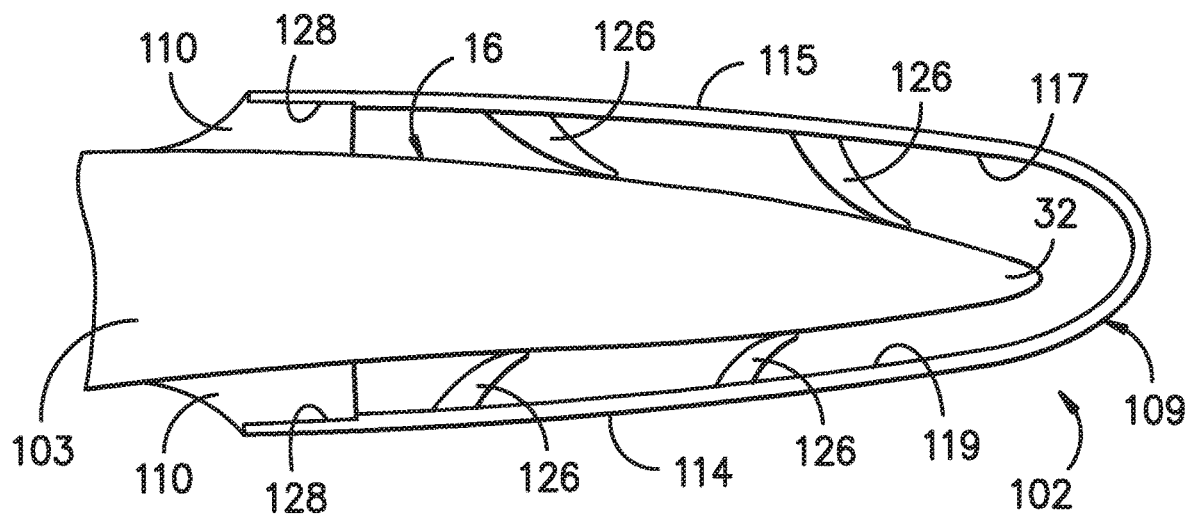
FIG. -12-

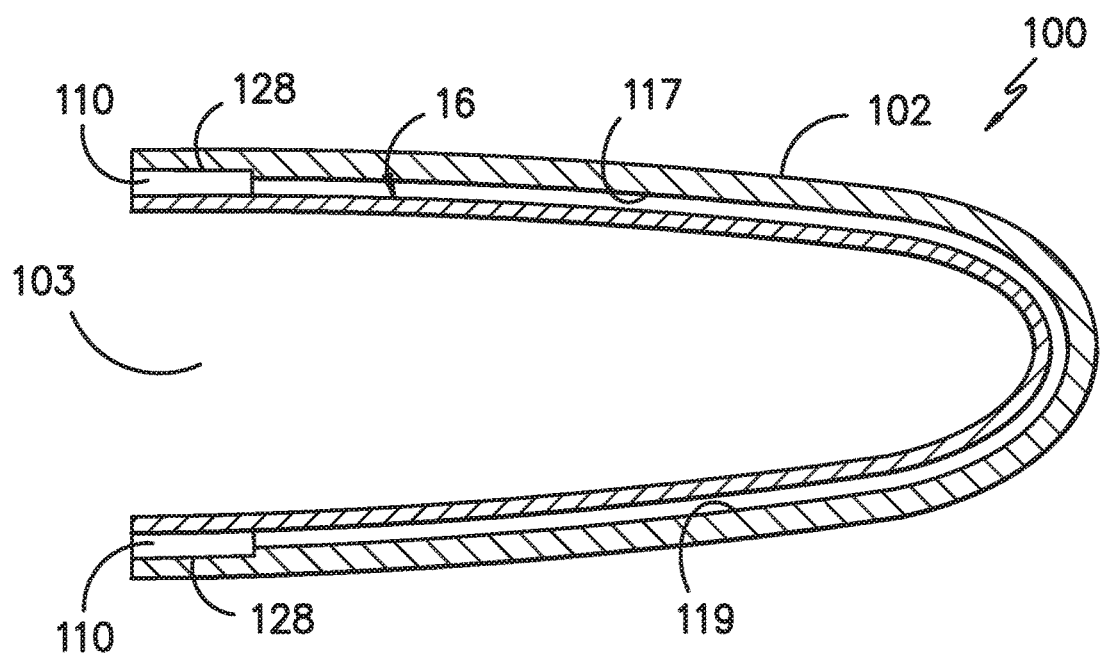
FIG. -13-
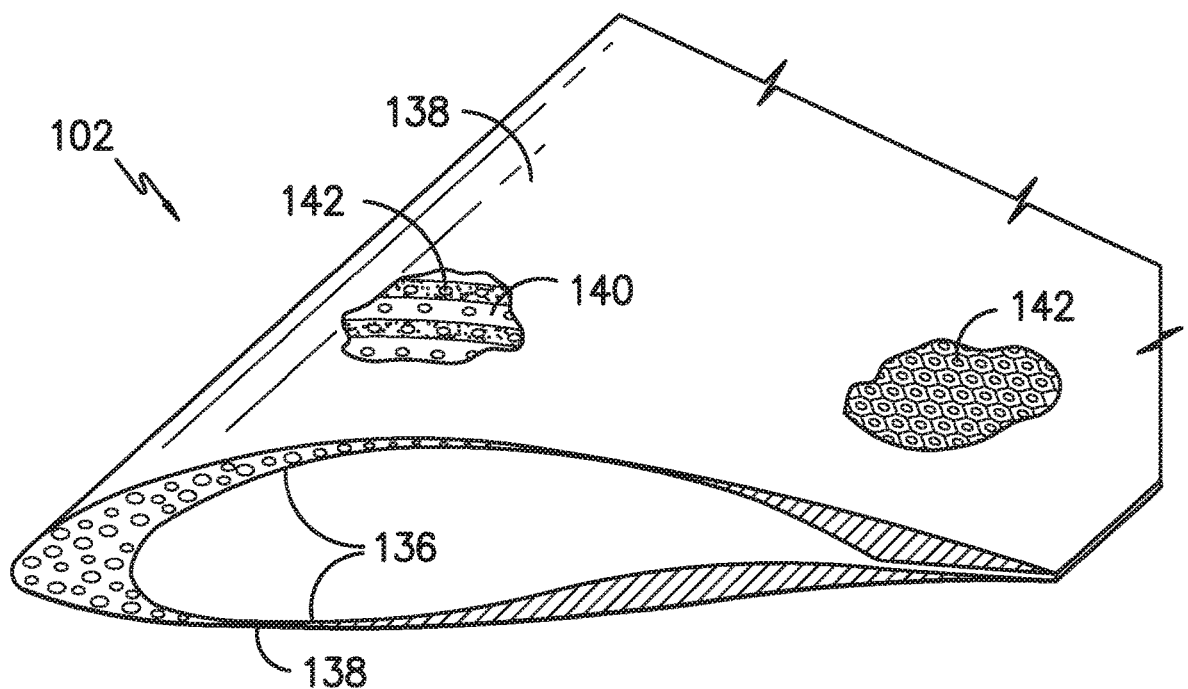
FIG. -14-

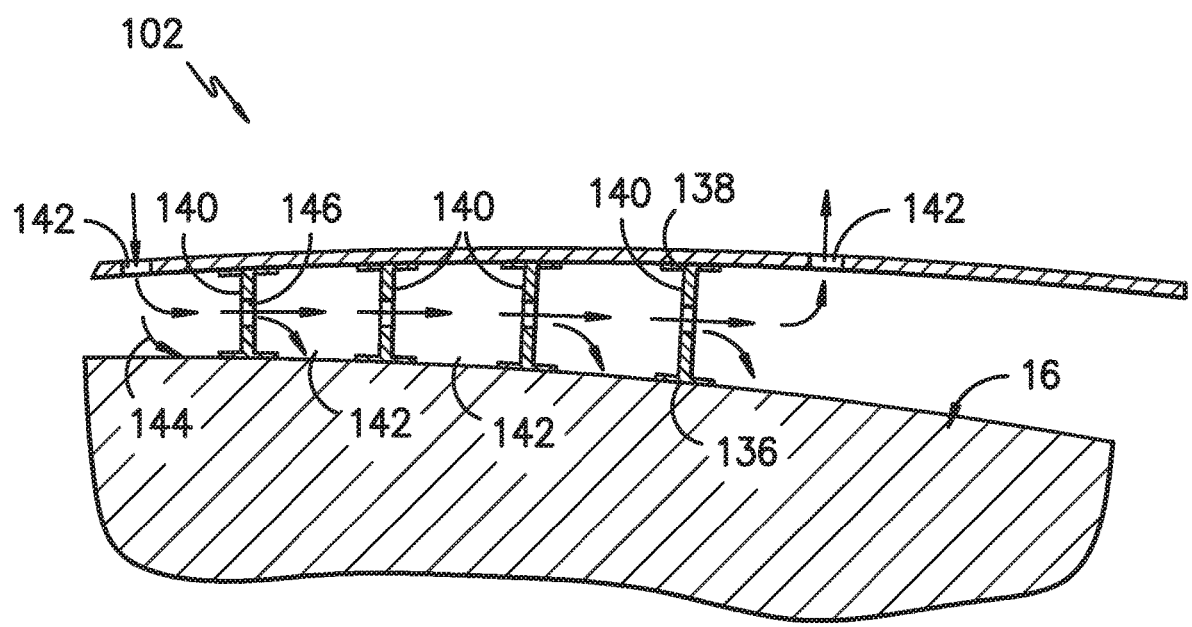
FIG. -15-
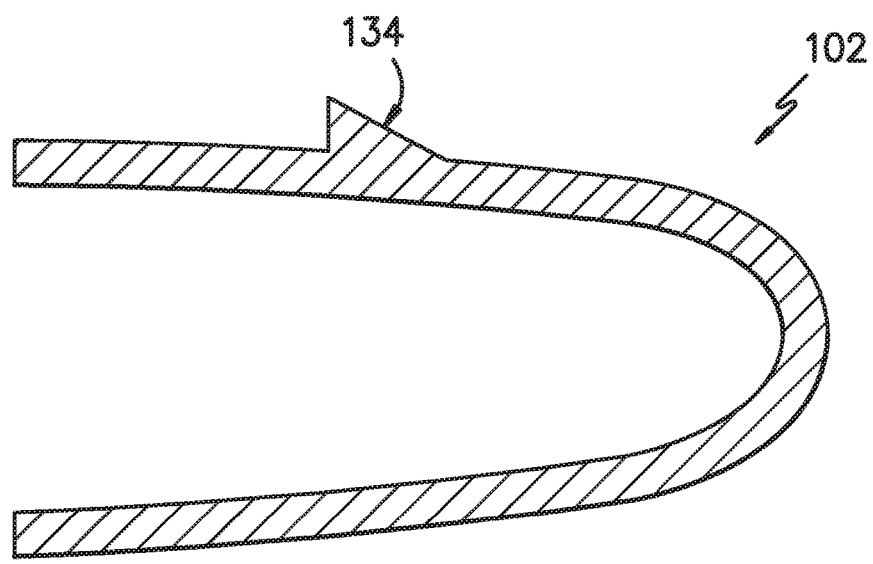
FIG. -16-

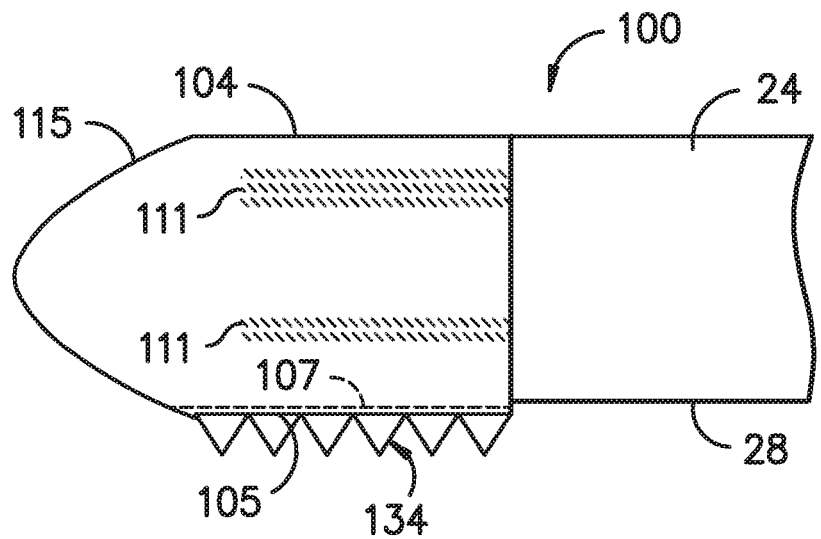

FIG. -17-

```
200
  ↘
        ┌─ 202
FORM THE BLADE TIP SLEEVE WITH A PRESSURE SIDE, A
SUCTION SIDE, A FIRST OPEN SPAN-WISE END, A CLOSED
LEADING EDGE, A TRAILING EDGE AND A PLURALITY OF
LEAF SPRINGS ON AN INNER SURFACE OF AT LEAST ONE
OF THE PRESSURE SIDE OR THE SUCTION SIDE

┌─ 204
SLIDE THE BLADE TIP SLEEVE ONTO THE BLADE TIP OF
THE ROTOR BLADE SUCH THAT LEAF SPRINGS ENGAGE
AT LEAST ONE OF A PRESSURE SIDE SURFACE OR A
SUCTION SIDE SURFACE OF THE ROTOR BLADE

┌─ 206
SECURE THE BLADE TIP SLEEVE TO THE ROTOR BLADE
            ADJACENT THE BLADE TIP
```

FIG. -18-

BLADE SLEEVE FOR A WIND TURBINE ROTOR BLADE AND ATTACHMENT METHODS THEREOF

FIELD OF THE INVENTION

The present disclosure relates in general to wind turbine rotor blades, and more particularly to blade sleeves for wind turbine rotor blades and attachment methods thereof.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures to the surface of the blade in order to increase the energy conversion efficiency during normal operation of the wind turbine by increasing the lift force of the blades while decreasing the drag force. Such components include, for example, winglets, tip extensions, and vortex generators. The purposes and operational principals of these devices are well understood by those skilled in the art.

The installation techniques and systems for attaching conventional add-on components can be expensive and time consuming, particularly for field installations. For example, typical field installation techniques require the use of attachment fixtures and significant dwell time for curing the attachment adhesives. The adhesives typically are considered hazardous materials and appropriate precautions and protective measures (both equipment and personnel) must be taken. In addition, the smearing of liquid or past adhesives while pushing the add-on components into place can result in inconsistent and unpredictable results, particularly for tip extensions that are pushed onto the tip end of an existing blade in the field.

In addition, one conventional method for the addition of tip extensions involves cutting off the existing blade tip so as to integrate the extension with internal blade structure. This process is time consuming, expensive and has the risk of damage to the main blade structure.

Even further, the aerodynamic shape of wind turbine rotor blades is often designed as if the blade does not deform in operation, however, elastic deformation is present in practice and can be significant. Therefore, the performance of the rotor blade may be deficient in any number of ways with respect to aerodynamics and acoustics. After the molds for a blade design are manufactured however, it is expensive to create new molds to correct such deficiencies.

Thus, the industry is continuously seeking improved blade tip shapes. Accordingly, one way to implement blade tip shape variations on existing rotor blades is to use tip sleeves. As such, the present disclosure is directed to blade tip sleeves and methods for attaching same to wind turbine rotor blades in a fast and low-cost operation that also provides for a repositioning opportunity to ensure accurate component placement.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a blade sleeve for a blade tip of a rotor blade of a wind turbine. The blade sleeve includes a rapid-prototyped body having a pressure side, a suction side, a first open span-wise end, a closed leading edge, and a trailing edge. Further, the body is slidable onto the blade tip of the rotor blade. In addition, the blade sleeve includes at least one additional rapid-prototyped feature integral with the body.

In one embodiment, the trailing edge may be separated along a complete length of the trailing edge. Alternatively, the trailing edge may not be separated or may be partially separated.

In another embodiment, the additional rapid-prototyped feature(s) may include one or more rapid-prototyped structural or attachment features or one or more rapid-prototyped aerodynamic features. For example, in one embodiment, the one or more rapid-prototyped structural or attachment features may include at least one of one of one or more leaf springs, internal or external recesses, structural component (s), and/or any other feature rapid-prototyped or printed to or with the body of the blade sleeve.

More specifically, in certain embodiments, the leaf spring (s) may extend from an inner surface of either of both of the pressure or suction sides of the body of the blade sleeve.

In further embodiments, the external recesses may be formed in an outer surface of either or both of the pressure or suction sides of the body or in the closed leading edge of the body. As such, the blade sleeve may further include a lightning receptor within one or more of external recesses. In related embodiments, the blade sleeve may also include a second open span-wise end opposite the first open span-wise end. In such embodiments, the rotor blade may extend at least partially through the second open span-wise end of the blade sleeve. As such, a lightning receptor at the blade tip can be exposed via the second open span-wise end of the blade sleeve and electrically coupled to the lightning receptor within the external recess of the tip sleeve.

Alternatively or in addition to the lightning receptors, the blade sleeve may also include a polymer (e.g. polyurethane, RTV, soft PVC, etc.), metal or fiber-reinforced structural feature within one or more of the external recesses. In such embodiments, the structural features are configured to protect the rotor blade from leading edge erosion.

In additional embodiments, the internal recesses may be formed in an inner surface of one or more both of the pressure or suction sides of the body and/or in the first and second open span-wise ends. In such embodiments, the blade sleeve may include double-side tape within one or more of the internal recesses that can easily secure the tip sleeve to the rotor blade.

In particular embodiments, the structural component(s) of the blade sleeve may include at least one of the pressure side or the suction side of the body being constructed of a double-wall configuration having an inner wall and an outer wall with one or more internal ribs extending between the inner and outer walls. In such embodiments, the inner and outer walls and/or the internal ribs may form one or more holes, openings, or channels configured to allow an adhesive to pass therethrough so as to secure the blade sleeve to the blade tip of the rotor blade. At the same time, the internal ribs between the inner and outer walls are configured to provide increased bending stiffness of the outer shell so as to improve the contour accuracy and stability of the tip sleeve at a lower weight (improving edgewise fatigue loads, for example).

In another embodiment, the rapid-prototyped aerodynamic feature(s) of the blade sleeve may include vortex generators, winglets, tip caps, boundary layer energizers, one or more drain holes, a fence, a serrated trailing and/or leading edge, or any other aerodynamic features.

In another aspect, the present disclosure is directed to a method for securing a blade sleeve to a blade tip of a rotor blade. The method includes forming the blade sleeve with a pressure side, a suction side, a first open span-wise end, a closed leading edge, a trailing edge and one or more leaf springs on an inner surface of at least one of the pressure side or the suction side. The method also includes sliding the blade sleeve onto the blade tip of the rotor blade such that the leaf spring(s) engage at least one of a pressure side surface or a suction side surface of the rotor blade. Further, the method includes securing the blade sleeve to the rotor blade adjacent the blade tip.

In one embodiment, the step of forming the blade sleeve may include rapid-prototyping, via a computer-numerical-control (CNC) device, the blade sleeve. As such, the leaf spring(s) may be integral with the pressure and suction sides of the blade sleeve. In another embodiment, the step of securing the blade sleeve to the rotor blade adjacent the blade tip may include securing the leaf springs to at least one of the pressure side surface or the suction side surface of the rotor blade via friction.

In yet another aspect, the present disclosure is directed to a rotor blade assembly. The rotor blade assembly includes a rotor blade extending between a blade root and a blade tip and a blade sleeve secured over the blade tip. The blade sleeve includes a rapid-prototyped body having a pressure side, a suction side, a first open span-wise end, a closed leading edge, and a trailing edge. Further, the body is slidable onto the blade tip of the rotor blade. In addition, the blade sleeve includes at least one additional rapid-prototyped structural or attachment feature integral with the body, including but not limited to one or more leaf springs, one or more internal or external recesses, and/or one or more structural components. It should be understood that the rotor blade assembly may include any of the features discussed above or described in greater detail below.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a conventional wind turbine;

FIG. 2 illustrates a perspective view of one embodiment of a rotor blade of a wind turbine having a blade sleeve secured over a blade tip of the rotor blade according to the present disclosure;

FIG. 3 illustrates a partial, perspective view of one embodiment of a rotor blade having a blade sleeve secured over a blade tip of the rotor blade according to the present disclosure;

FIG. 4 illustrates a cross-sectional view of the rotor blade and blade sleeve of FIG. 3 along line 4-4;

FIG. 5 illustrates a partial, perspective view of another embodiment of a rotor blade having a blade sleeve secured to a blade tip of the rotor blade according to the present disclosure, particularly illustrating a blade sleeve having opposing open span-wise ends;

FIG. 6 illustrates a partial top view of one embodiment of a blade sleeve being slid onto a blade tip of a rotor blade according to the present disclosure;

FIG. 7 illustrates a partial top view of the embodiment of FIG. 6 depicting the blade sleeve slid onto the blade tip of the rotor blade according to the present disclosure;

FIG. 8 illustrates a partial top view of the embodiment of FIG. 6 depicting the release liners being peeled from tape strips through the separated trailing edge of the blade sleeve;

FIG. 9 illustrates a partial top view of the embodiment of FIG. 8 depicting the last release liner being peeled from tape strips through the separated trailing edge of the blade sleeve;

FIG. 10 illustrates a partial top view of the embodiment of FIG. 6 after final assembly of the blade sleeve onto the blade tip of the rotor blade;

FIG. 11 illustrates a cross-sectional view of one embodiment of a blade sleeve according to the present disclosure, particularly illustrating a plurality of external recesses formed in the pressure and suction sides and the leading edge of the blade sleeve;

FIG. 12 illustrates a side view of one embodiment of a blade sleeve according to the present disclosure, particularly illustrating a plurality of leaf springs extending from an inner surface thereof;

FIG. 13 illustrates a cross-sectional view of one embodiment of a blade sleeve according to the present disclosure, particularly illustrating a plurality of internal recesses formed therein;

FIG. 14 illustrates a perspective view of one embodiment of a blade sleeve according to the present disclosure, particularly illustrating a blade sleeve having a double-wall configuration;

FIG. 15 illustrates a partial, cross-sectional view of one embodiment of a blade sleeve according to the present disclosure, particularly illustrating a blade sleeve having a double-wall configuration;

FIG. 16 illustrates a cross-sectional view of one embodiment of a blade sleeve according to the present disclosure, particularly illustrating an aerodynamic feature rapid-prototyped therewith;

FIG. 17 illustrates a partial, top view of another embodiment of a blade sleeve according to the present disclosure, particularly illustrating an aerodynamic feature rapid-prototyped therewith; and FIG. 18 illustrates a flow diagram of one embodiment of a method for securing a blade sleeve to a blade tip of a rotor blade according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a wind turbine 10 of conventional construction. The wind turbine 10 includes a tower 12 with a nacelle 14 mounted thereon. A plurality of blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring now to FIG. 2, a rotor blade assembly 100 for the wind turbine 10 is illustrated with a blade sleeve 102 attached to a surface 24 (e.g., suction side surface) of the rotor blade 16 according to the present disclosure is illustrated. Further, as shown, the rotor blade 16 has a pressure side 22 and a suction side 24 extending between a leading edge 26 and a trailing edge 28 that extend from a blade tip 32 to a blade root 34. The rotor blade 16 further defines a pitch axis 40 relative to the rotor hub 18 (FIG. 1) that typically extends perpendicularly to the rotor hub 18 and blade root 34 through the center of the blade root 34. A pitch angle or blade pitch of the rotor blade 16, i.e., an angle that determines a perspective of the rotor blade 16 with respect to the air flow past the wind turbine 10, may be defined by rotation of the rotor blade 16 about the pitch axis 40. In addition, the rotor blade 16 further defines a chord 42 and a span 44. More specifically, as shown in FIG. 2, the chord 42 may vary throughout the span 44 of the rotor blade 16. Thus, a local chord may be defined for the rotor blade 16 at any point on the blade 16 along the span 44.

Referring now to FIGS. 3-4 and 6-10, the blade sleeve 102 as described herein includes a rapid-prototyped generally hollow body 109 having a pressure side 114, a suction side 115, a first open span-wise end 103, a closed leading edge 104, and a trailing edge 106. As such, the blade sleeve 102 may be formed using any suitable automated deposition of materials via technologies such as 3-D Printing, additive manufacturing, automated fiber deposition, as well as other techniques that utilize CNC control and multiple degrees of freedom to deposit material. 3-D printing, as used herein, is generally understood to encompass processes used to synthesize three-dimensional objects in which successive layers of material are formed under computer control to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes.

Referring still to FIGS. 3-4 and 6-10, the body 109 of the blade sleeve 102 is slidable onto the blade tip 32 of the rotor blade 16. In addition, as shown in FIGS. 6-10, the trailing edge 106 may be separated in that a suction side edge 105 and a pressure side edge 107 are not bonded or sealed together along at least part of the length of the trailing edge 106, which allows the pressure and suction sides of the blade sleeve 102 to be pulled apart to an extent necessary to slide the blade sleeve 102 onto the blade tip 32. In certain embodiments as depicted in the figures, the trailing edge 106 is separated along essentially the entire length of the trailing edge, although this is not a requirement for all embodiments. In such embodiments, the separated trailing edge 106 can also be useful for draining water that accumulates in the blade sleeve 102, potentially escaping out of enclosed drain holes of the rotor blade 16.

Although FIG. 6 depicts (by arrows) the blade sleeve 102 being slid linearly in a span-wise direction onto the blade 16, it should be appreciated that this sliding motion may include a chord-wise direction component that is aided by the separated nature of the trailing edge 106. In still another embodiment, the trailing edge 106 may not be separated.

In addition, as shown in FIGS. 3-4 and 11-16, the blade sleeve 102 also includes at least one additional rapid-prototyped or printed feature integral with the body 109 e.g. that can be directly rapid-prototyped onto or with the blade sleeve 102 using the methods described herein. Such features may be structural, attachment, or aerodynamic features. Thus, the features can be beneficial for mounting the blade sleeve 102 to the rotor blade 16, aligning or positioning the blade sleeve 102 on the rotor blade 16, increasing the stiffness and/or strength of the rotor blade 16 (i.e. where the sleeve 102 is mounted), accommodating a lightning protection system of the rotor blade 16, improving aerodynamic properties of the rotor blade 16 at the blade tip 32, and/or reducing undesirable noise caused by the rotor blade 16. For example, the additional rapid-prototyped structural or attachment feature(s) may include one of one or more leaf springs 126, one or more internal or external recesses 128, 130, one or more structural components 132, and/or any other feature rapid-prototyped to the body 109 of the blade sleeve 102. In addition, the additional rapid-prototyped may include one or more aerodynamic features 134 (FIGS. 16 and 17).

Referring particularly to FIGS. 3-5 and 11, various embodiments of a blade sleeve 102 having external recesses 130 formed in an outer surface of either or both of the pressure or suction sides 114, 115 or in the closed leading edge 108 of the body 109 are illustrated. As shown, the external recesses 130 may be formed using the methods described herein (e.g. 3-D printing) and/or may be machined into the outer surface of the tip sleeve 102. Further, as shown in FIGS. 3 and 4, the blade sleeve 102 may further include a lightning receptor 129 within one or more of external recesses 130. Thus, in such embodiments, the accommodation for lightning receptor(s) 129 may pass through the blade sleeve 102 and be exposed to the environment. In addition, it should be understood that the external recesses 130 are configured to accommodate a lightning protection system that varies in location from blade to blade or between different blade models.

In further embodiments, the blade sleeve 102 may also include an optional second open span-wise end 118 opposite the first open span-wise end 103. Thus, as shown in FIG. 5, the blade tip 32 of the rotor blade 16 may extend at least partially through the second open span-wise end 118 of the blade sleeve 102. As such, the blade tip 32 may include an additional lightning receptor 129 that can be exposed via the second open span-wise end 118. Accordingly, the lightning receptor 129 at the blade tip 32 is exposed via the second open span-wise end of the blade sleeve 102 and electrically coupled to the lightning receptor 129 within the external recess 130 of the tip sleeve 102. It should be understood that the embodiment of the blade sleeve 102 having two open span wise ends 103, 118 may be located at any suitable span-wise location of the rotor blade 16, including near the blade tip 32 as well as a more inboard location, e.g. toward mid-span.

In addition, as shown in FIG. 11, the blade sleeve 102 may include a fiber-reinforced structural feature 133 within one or more of the external recesses 130. For example, in such embodiments, the fiber-reinforced structural feature 133 may be formed of a thermoplastic or a thermoset material reinforced with any suitable fiber material. The fiber material may include, for example, glass fibers, carbon fibers, polymer fibers, ceramic fibers, nanofibers, wood or flax fibers, bamboo fibers, metal fibers, or similar, or combinations thereof. As such, the fiber-reinforced structural feature(s) 133 are configured to provide a desired strength to the blade sleeve 102 in areas needed extra support, e.g. at the leading edge and/or at spar cap locations. In additional embodiments, the structural features 133 may provide leading edge erosion protection, which can also have anti-stick properties reducing insect contamination build-up.

Referring now to FIG. 12, a side view of one embodiment of a blade sleeve 102 having rapid-prototyped features corresponding to a plurality of leaf springs 126 is illustrated. For example, as shown, the leaf spring(s) 126 may extend from an inner surface 117, 119 of either or both of the pressure or suction sides 114, 115 of the body 109 of the tip sleeve 102. More specifically, as shown, a plurality of leaf springs 126 extend from the inner surfaces 117, 119 of both of the pressure and suction sides 114, 115 of the body 109. As such, the leaf springs 126 are configured to engage the pressure and/or suction side surfaces 22, 24 of the rotor blade 16 such that the blade sleeve 102 is secured to the blade tip 32 via friction. It should be understood that the term "leaf spring" as described herein generally encompasses any simple spring configuration having any suitable shape that extends from the blade sleeve 102 and engages the rotor blade 16 so as to provide a friction fit therebetween.

For example, as shown in the illustrated embodiment, the leaf springs 126 have a generally arcuate cross-sectional shape, with the arc of each spring pointing towards the closed tip of the tip sleeve 102 (i.e. opposite the open span-wise end 103) such that the blade sleeve 102 can be easily slid onto the blade tip 32 of the rotor blade 16 and secured thereto. Thus, when engaged, the springs 126 are compressed against the pressure and suction side surfaces 22, 24 of the rotor blade 16. As such, the blade sleeve 102 with the leaf springs 126 can be easily aligned and affixed to the blade tip 32 quickly with minimal field preparation. Further, the leaf spring(s) 126 may also dampen vibration and/or noise of the rotor blade 16. In additional embodiments, segmenting the leaf springs 126 in a few chord-wise sections may allow for improved accommodation of manufacturing tolerances/variations of the blades 16.

In addition, it should also be understood that the blade sleeve 102 may be attached to the rotor blade 16 using any other suitable attachment methods, e.g. as shown in FIGS. 6-10. More specifically, as shown, strips of the double-sided adhesive tape 110 are adhered in any desired pattern or configuration onto the blade surface 24 (e.g., the suction side surface) adjacent to the blade tip 32. It should be appreciated that a single, larger strip of tape 110 could also be utilized in place of multiple strips. Although not depicted in the figures, the tape strips may also be adhered to the pressure side surface 22. The pattern of the tape strips 110 may be span-wise oriented and spaced-apart, as depicted in FIG. 6.

It should be appreciated that the tape strips 110 may be applied to either or both of the blade surfaces 22, 24. The tape strips 110 have a release liner 112 attached to exposed sides of the tape 110 to protect an underlying adhesive layer 111.

In the embodiment of FIG. 6, the tape strips 110 are initially adhered to the blade surface 24, wherein the blade sleeve 102 is subsequently held or otherwise maintained in the desired position on the blade (e.g., by being pressed against the tape strips 110) for subsequent removal of the release liner 112 from between the underside of the tip sleeve 102 and the tape 110. It should be appreciated that there may be some degree of inherent "play" or movement of the blade sleeve 102 at the desired position on the blade as the release liners 112 are removed.

In an alternate embodiment, the tape strips 110 may be applied to an inner surface 117, 119 of the blade sleeve 102 in the same pattern discussed above, which is then pressed against the blade surface 24, 22 for subsequent removal of the release liner 112 from the opposite side of the tape 110 (as explained more fully below). In addition, as shown in FIGS. 12 and 13, the blade sleeve 102 may include internal recesses 128 formed in one or more of the inner surfaces 117, 119 of either or both of the pressure or suction sides 114, 115 of the body 109, e.g. at the first and second open span-wise ends 103, 118. In such embodiments, as shown, the double-side tape 110 may be configured at least partially within the internal recesses 128. More specifically, as shown, the blade sleeve 102 includes double-side tape 110 recessed within the pressure and suction sides 114, 115 of the body 109 at the first open span-wise end 103. In addition, as shown in FIG. 12, the double-side tape 110 may taper towards the blade surface so as to eliminate a step between the blade sleeve 102 and the rotor blade 16. As such, the edge of the blade sleeve 102 that overlaps the blade tip 32 of the rotor blade 16 may sit more flush with the blade surface.

Referring particularly to FIG. 6, in further embodiments, it may be desired to coat the surface of the blade 16 where the blade sleeve 102 will be placed with a liquid or paste adhesive (e.g., and epoxy) 116, for example to compensate for any surface irregularities or mismatch between the blade surface and the blade sleeve 102 due, for example, to machining tolerances, before positioning the tape strips 110 on the blade surface 24. The tape strips 110 and blade sleeve 102 can then be attached before the adhesive 116 cures, which provides a degree of positioning adjust of the blade sleeve 102 due to the fact that the adhesive 116 is still in liquid or paste form. Alternatively, the adhesive 116 (with tape strips attached thereto) may be allowed to cure before placement of the blade sleeve 102. In either case, this particular embodiment also gives the advantage of a strong bond provided by the adhesive 116 in combination with the shear stress reduction provided by the tape strips 110.

As shown in FIGS. 7-9, each of the tape strips 110 has a length so as to define an extension tail 113 that extends span-wise beyond the span-wise end 103 of the blade sleeve 102. The length of the extension tails 113 may vary. For example, the strips 110 furthest from the trailing edge 106 may have a longer extension tail 113 to facilitate pulling the extension tail through the trailing edge 106, as compared to the tape strip 110 closest to the trailing edge 106. Alternatively, the extension tail 113 may encompass any other material or component that is attached to the tape strip, such as a wire, string, ribbon, and so forth. With the illustrated embodiment, because the extension tails 113 are comprised of the release liner 112 and underlying adhesive, as depicted in FIG. 7, after removal of the release liner 112, the remaining adhesive layer of the tape strips adhesive 111 remains, as depicted in FIG. 8, and may need to be trimmed.

Referring to FIGS. 7-10, with the blade sleeve 102 held at the desired position on the blade tip 32, starting from the tape strip 110 furthest from the separated trailing edge 106, the extension tails 113 and the release liners 112 of the respective tape strips 110 are pulled through the separated trailing edge 106 and away from the blade sleeve 102 at an angle such that that entire release liner 112 is removed along the length of the tape strip 110 while maintaining position of the blade sleeve 102 against the blade surface 24 to attach the exposed adhesive 111 under the release liner 112 to either the surface 24 of the rotor blade 16 or the inner surface 117, 119 of the blade sleeve 102 (depending on initial placement of the tape strips 110 on the blade surface 24 or on the interior surface of the blade sleeve 102).

After all of the release liners 112 have been removed in sequential order from furthest to closest to the separated trailing edge 106, the remaining adhesive layers 111 can be trimmed to provide the finished blade depicted in FIG. 10.

Referring to FIGS. 6-10, in embodiments having a separated trailing edge 106, the suction and pressure sides 105, 107 of the separated trailing edge 106 may extend past the trailing edge 28 of the rotor blade 16 to provide a chord-wise extension aspect to the blade sleeve 102. These edges can then be bonded together after attaching the blade sleeve 102 to the rotor blade 16 in the manner discussed above. The edges 105, 107 may extend an equal chord-wise distance past the blade trailing edge 28, or the edges 105, 107 may be offset in that one of the edges 105, 107 extends past the other. The dashed line indicating the pressure side surface edge 107 is meant to depict both of these configurations. In an alternate embodiment, the suction and pressure side surface edges 105, 107 extend equally beyond the trailing edge 28 of the rotor blade 16.

It should be appreciated that the methods described herein may be implemented with a number of different commercially available double-sided adhesive tapes. For example, the tape strips 110 may be a foam-based strip member with adhesive on opposite interface sides thereof, such as a Very High Bond (VHB™) or SAFT (Solar Acrylic Foam Tape) foam-based strip material.

Referring now to FIGS. 14 and 15, as mentioned, the rapid-prototyped features of the blade sleeve 102 may also include one or more structural components 132. For example, as shown, the structural component(s) 132 of the blade sleeve 102 may include at least one of the pressure side 114 or the suction side 115 of the body 109 being constructed of a double-wall configuration (FIG. 15) having an inner wall 136 and an outer wall 138 with internal ribs 140 extending between the inner and outer walls 136, 138. It should be understood that the internal ribs 140 of such a structure may have any suitable configuration that can be rapid-prototyped or printed as described herein. For example, as shown particularly via the cutaway portion of FIG. 14, the internal ribs 140 may have a honeycomb configuration.

In addition, as shown in FIGS. 14 and 15, the inner and outer walls 136, 138 may include one or more holes 142 configured to receive an adhesive 144. Further, as shown, the internal ribs 140 may have one or more openings 146 configured to receive an adhesive 144 that secures the blade sleeve 102 to the blade tip of the rotor blade 16. Thus, in such embodiments, the adhesive 144 may be injected through a first hole 142 in the outer wall 138 and travel through the openings 146 of the internal ribs 140 and the holes 142 of the inner wall 136. In addition, as shown, extra adhesive 144 may exit the double-wall configuration via a second hole 142.

Referring now to FIGS. 16-18, the rapid-prototyped features of the blade sleeve 102 may further include one or more aerodynamic features 134 as an integral feature of the sleeve 102. More specifically, as shown, the aerodynamic feature(s) 134 of the blade sleeve 102 may include vortex generators (FIG. 16), blade tip extensions (as shown generally in the figures), winglets, tip caps, boundary layer energizers, a fence, a serrated edge (FIG. 8), or any other aerodynamic feature. It should be appreciated that the aerodynamic feature(s) 134 is depicted as a vortex generator and a serrated profile for purposes of illustration only, and that any design of aerodynamic feature 134 is within the scope and spirit of the invention. As such, time and expenses related to installation of such features can be eliminated by printing such features directly with the blade sleeve 102.

In addition, by printing such features directly with the blade sleeve 102, aerodynamic effectiveness of the sleeve 102 can be improved as the aerodynamic impact associated with attachment methods of such features can be eliminated. More specifically, with this configuration, the "step" profile at the transition from the aerodynamic feature 134 and the blade surface can be eliminated.

Referring now to FIG. 18, a flow diagram of one embodiment of a method 200 for securing a blade sleeve 102 to a blade tip 32 of a rotor blade 16 is illustrated. As shown at 202, the method 200 includes forming the blade sleeve 102 with a pressure side 114, a suction side 115, a first open span-wise end 103, a closed leading edge 108, a trailing edge 106 and a plurality of leaf springs 126 on an inner surface 117, 119 of either or both of the pressure or suction sides 114, 115. As shown at 204, the method 200 sliding the blade sleeve 102 onto the blade tip 32 of the rotor blade 16 such that the leaf springs 126 engage at least one of a pressure side surface 22 or a suction side surface 24 of the rotor blade 16. As shown at 206, the method 200 securing the blade sleeve 102 to the rotor blade 16 adjacent the blade tip 32.

In one embodiment, the step of forming the blade sleeve 102 may include printing, via a computer-numerical-control (CNC) device, the blade sleeve 102. For example, in one embodiment, the CNC device may include a 3-D printer. In another embodiment, the step of securing the blade sleeve 102 to the rotor blade 16 adjacent the blade tip 32 may include securing the leaf springs 126 to either or both of the pressure or suction side surfaces 22, 24 of the rotor blade 16 via friction. In addition, the blade sleeve 102 may be optionally further secured to the rotor blade using adhesive, mechanical fasteners, or any other suitable securing components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blade sleeve for a blade tip of a rotor blade of a wind turbine, the blade sleeve comprising: a rapid-prototyped body having a pressure side, a suction side, a first open span-wise end, a closed leading edge, and a trailing edge, the body being slidable onto the blade tip of the rotor blade; and, at least one additional rapid-prototyped aerodynamic feature formed integrally with the body on an outer surface thereof wherein the at least one additional rapid-prototyped aerodynamic feature forms a discontinuity in the outer surface thereof, the discontinuity defining one of a vortex generator, a drain hole, a boundary layer energizer, a fence, a serrated leading edge, or a serrated trailing edge.

2. The blade sleeve of claim 1, wherein the trailing edge is separated along a complete length of the trailing edge.

3. The blade sleeve of claim 1, further comprising one or more rapid-prototyped structural or attachment features.

4. The blade sleeve of claim 3, wherein the one or more rapid-prototyped structural or attachment features comprise at least one of one or more leaf springs or one or more internal or external recesses.

5. The blade sleeve of claim 4, wherein the one or more leaf springs extend from an inner surface of at least one of the pressure side or the suction side of the body.

6. The blade sleeve of claim 4, wherein the one or more external recesses are formed in an outer surface of at least one of the pressure side or the suction side of the body or in the closed leading edge of the body.

7. The blade sleeve of claim 6, further comprising a lightning receptor within one or more of external recesses.

8. The blade sleeve of claim 7, further comprising a second open span-wise end opposite the first open span-wise end, wherein the rotor blade is configured to extend at least partially through the second open span-wise end.

9. The blade sleeve of claim 6, further comprising a fiber-reinforced structural feature within one or more of the external recesses.

10. The blade sleeve of claim 8, wherein the one or more internal recesses are formed in an inner surface of at least one of the pressure side or the suction side of the body or in the first open span-wise end and the second open span-wise end of the body, wherein the blade sleeve further comprises double-side tape within one or more of the internal recesses.

11. The blade sleeve of claim 4, wherein the one or more structural components comprise at least one of the pressure side or the suction side of the body comprising a double-wall configuration having an inner wall and an outer wall with internal ribs extending between the inner and outer walls.

12. The blade sleeve of claim 11, wherein the internal ribs form one or more holes or channels configured to receive an adhesive that secures the blade sleeve to the blade tip of the rotor blade.

* * * * *